(12) United States Patent
Yang (10) Patent No.: US 11,404,708 B2
(45) Date of Patent: Aug. 2, 2022

(54) DEVICE AND METHOD FOR CONTROLLING START-UP OF FUEL CELL VEHICLE

(71) Applicants: Hyundai Motor Company, Seoul (KR); Kia Motors Corporation, Seoul (KR)

(72) Inventor: Sung Ho Yang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/089,777

(22) Filed: Nov. 5, 2020

(65) Prior Publication Data

US 2021/0376343 A1    Dec. 2, 2021

(30) Foreign Application Priority Data

Jun. 2, 2020   (KR) .......................... 10-2020-0066538

(51) Int. Cl.
| | |
|---|---|
| *H01M 8/04082* | (2016.01) |
| *H01M 8/04858* | (2016.01) |
| *H01M 8/04701* | (2016.01) |
| *B60L 58/31* | (2019.01) |
| *B60L 58/33* | (2019.01) |
| *H01M 8/04302* | (2016.01) |

(52) U.S. Cl.
CPC ......... *H01M 8/04201* (2013.01); *B60L 58/31* (2019.02); *B60L 58/33* (2019.02); *H01M 8/0488* (2013.01); *H01M 8/04302* (2016.02); *H01M 8/04723* (2013.01); *H01M 2250/20* (2013.01)

(58) Field of Classification Search
CPC .... B60L 58/31; B60L 58/33; H01M 2250/20; H01M 8/04201; H01M 8/04302; H01M 8/04723; H01M 8/0488
See application file for complete search history.

(56) References Cited

U.S. PATENT DOCUMENTS

2014/0004438 A1*   1/2014   Wake .................. H01M 8/0491
                                                                   429/444

* cited by examiner

*Primary Examiner* — Victoria H Lynch
(74) *Attorney, Agent, or Firm* — Fox Rothschild LLP (57) ABSTRACT

A device and a method for controlling start-up of a fuel cell vehicle are provided and include a table in which a time-difference between a hydrogen supply initiating time-point and an air supply initiating time-point is recorded for each cooling water temperature at a fuel cell stack outlet. The air supply initiating time-point is adjusted based on the table during the start-up of the fuel cell vehicle to prevent a cell voltage deviation and a cell reverse voltage of the fuel cell stack. A temperature sensor measures a cooling water temperature of a fuel cell stack and a controller adjusts the air supply initiating time-point based on the cooling water temperature of the fuel cell stack during start-up of a fuel cell vehicle.

15 Claims, 6 Drawing Sheets

DEVICE AND METHOD FOR CONTROLLING START-UP OF FUEL CELL VEHICLE

CROSS-REFERENCE TO RELATED APPLICATION

This application claims the benefit of priority to Korean Patent Application No. 10-2020-0066538, filed on Jun. 2, 2020, the entire contents of which are incorporated herein by reference.

TECHNICAL FIELD

The present disclosure relates to a technology for preventing a cell reverse voltage as well as a cell voltage deviation during start-up of a fuel cell vehicle.

BACKGROUND

In general, a fuel cell vehicle includes a fuel cell system having a fuel cell stack in which a plurality of fuel cells are stacked, a fuel supply system that supplies hydrogen or the like, which is fuel, to the fuel cell stack, an air supply system that supplies oxygen, which is an oxidant required for an electrochemical reaction, a thermal management system that controls a temperature of the fuel cell stack, a battery management system that stores energy produced by the fuel cell stack, and the like. The fuel supply system decompresses compressed hydrogen inside a hydrogen tank and supplies the decompressed hydrogen to a fuel electrode (an anode) of the stack. In addition, the air supply system operates an air blower to supply suctioned external air to an air electrode (a cathode) of the stack.

When the hydrogen is supplied to the fuel electrode of the fuel cell stack and the oxygen is supplied to the air electrode thereof, hydrogen ions are separated from the fuel electrode through a catalytic reaction. The separated hydrogen ions are transferred to an oxidized electrode, which is the air electrode, through an electrolyte membrane, and the hydrogen ions separated from the fuel electrode, electrons, and the oxygen together cause the electrochemical reaction at the oxidized electrode, thereby obtaining electrical energy. Specifically, electrochemical oxidation of the hydrogen occurs at the fuel electrode, and electrochemical reduction of the oxygen occurs at the air electrode. Due to a movement of the electrons generated at this time, electricity and heat are generated. Further, water vapor or water is generated by a chemical reaction in which the hydrogen and the oxygen are coupled to each other.

A discharge apparatus is disposed to discharge the hydrogen, the oxygen, and the like that are not reacted with by-products such as the water vapor, the water, and the heat generated in the process of generating the electrical energy of the fuel cell stack. Gases such as the water vapor, the hydrogen, and the oxygen are released into the atmosphere through an exhaust passage. Components such as the air blower, a hydrogen recirculation blower, a water pump, and the like for driving the fuel cell are connected to a main bus terminal to facilitate start-up of the fuel cell. Various relays for facilitating power cutoff and connection, and a diode that prevents reverse current from flowing to the fuel cell may be connected to the main bus terminal.

Dry air supplied through the air blower may be humidified through a humidifier and then supplied to the cathode of the fuel cell stack. In addition, exhaust gas of the cathode may be used to humidify the dry air to be supplied to the cathode by being delivered to the humidifier in a humidified state by water generated inside. Such conventional technology of controlling the start-up of the fuel cell vehicle supplies the hydrogen and the air (the oxygen) at almost the same time (e.g., about 0.5 second difference) to the fuel cell stack without considering a temperature of the external air during the start-up. Thus, a cell voltage variation of the fuel cell stack is caused during start-up at a low temperature.

In addition, the conventional technology for controlling the start-up of the fuel cell vehicle has a problem in that a cell reverse voltage (e.g., about −0.8 V) of the fuel cell stack is caused during the start-up at the low temperature in a state in which the air is introduced into the cathode due to poorness of an air cutoff valve (ACV). For reference, water is generated due to the air previously introduced into the cathode. The water thus generated freezes at a reaction area at an anode side, which is at the low temperature, to cause a temporary hydrogen deficiency, resulting in a cell reverse voltage.

The matters described in this background art part are written to improve the understanding of the background of the invention, and may include matters other than the prior art already known to those skilled in the art to which this technology belongs.

SUMMARY

The present disclosure provides a device and a method for controlling start-up of a fuel cell vehicle that have a table in which a time difference between a hydrogen supply initiating time point and an air supply initiating time point is recorded for each cooling water temperature at an outlet of a fuel cell stack, and adjust the air supply initiating time point based on the table during the start-up of the fuel cell vehicle to prevent a cell reverse voltage as well as a cell voltage deviation of the fuel cell stack.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling start-up of a fuel cell vehicle may include a temperature sensor configured to measure a cooling water temperature of a fuel cell stack, and a controller configured to adjust an air supply initiating time point based on the cooling water temperature of the fuel cell stack during the start-up of the fuel cell vehicle. In one implementation, the temperature sensor may be configured to measure a cooling water temperature at an outlet of the fuel cell stack.

In one implementation, the device may further include storage configured to store a table, wherein a time difference between a hydrogen supply initiating time point and the air supply initiating time point for each cooling water temperature of the fuel cell stack may be recorded in the table. In this connection, the table may include a first table applied when air is not introduced into a cathode of the fuel cell stack, and a second table applied when the air is introduced into the cathode of the fuel cell stack.

In addition, the controller may be configured to adjust the air supply initiating time point based on the first table in response to determining that the air is not introduced into the cathode of the fuel cell stack, and adjust the air supply initiating time point based on the second table in response to determining that the air is introduced into the cathode of the fuel cell stack. The controller may be configured to, at a time point after a reference time after a pressure of hydrogen supplied to the fuel cell stack reaches a target pressure, determine that the air is not introduced into the cathode of the fuel cell stack when an open circuit voltage (OCV) of the fuel cell stack is less than a reference voltage, and determine that the air is introduced into the cathode of the fuel cell stack when the OCV of the fuel cell stack is equal to or greater than the reference voltage.

According to another aspect of the present disclosure, a method for controlling start-up of a fuel cell vehicle may include initiating a start-up sequence of the fuel cell vehicle, obtaining a cooling water temperature of a fuel cell stack, and adjusting an air supply initiating time point based on the obtained cooling water temperature. In this connection, the cooling water temperature may be a cooling water temperature at an outlet of the fuel cell stack.

In one implementation, the method may further include storing a table, wherein a time difference between a hydrogen supply initiating time point and the air supply initiating time point for each cooling water temperature of the fuel cell stack is recorded in the table. In this connection, the table may include a first table applied when air is not introduced into a cathode of the fuel cell stack, and a second table applied when the air is introduced into the cathode of the fuel cell stack. In addition, the adjusting of the air supply initiating time point may include determining whether the air is introduced into the cathode of the fuel cell stack, adjusting the air supply initiating time point based on the first table when the air is not introduced into the cathode of the fuel cell stack, and adjusting the air supply initiating time point based on the second table when the air is introduced into the cathode of the fuel cell stack.

The determining of whether the air is introduced into the cathode of the fuel cell stack may include detecting an open circuit voltage (OCV) of the fuel cell stack at a time point after a reference time after a pressure of hydrogen supplied to the fuel cell stack reaches a target pressure, determining that the air is not introduced into the cathode of the fuel cell stack when the OCV of the fuel cell stack is less than a reference voltage, and determining that the air is introduced into the cathode of the fuel cell stack when the OCV of the fuel cell stack is equal to or greater than the reference voltage.

According to another aspect of the present disclosure, a device for controlling start-up of a fuel cell vehicle may include storage configured to store a first table and a second table, wherein a time difference between a hydrogen supply initiating time point and an air supply initiating time point for each cooling water temperature at an outlet of a fuel cell stack is recorded in the first table and the second table, a temperature sensor configured to measure the cooling water temperature at the outlet of the fuel cell stack, and a controller configured to, during the start-up of the fuel cell vehicle, adjust the air supply initiating time point based on the first table when air is not introduced into a cathode of the fuel cell stack, and adjusts the air supply initiating time point based on the second table when the air is introduced into the cathode of the fuel cell stack.

In one implementation, wherein the controller may be configured to, at a time point after a reference time after a pressure of hydrogen supplied to the fuel cell stack reaches a target pressure, determine that the air is not introduced into the cathode of the fuel cell stack in response to determining that an open circuit voltage (OCV) of the fuel cell stack is less than a reference voltage, and determine that the air is introduced into the cathode of the fuel cell stack in response to determining that the OCV of the fuel cell stack is equal to or greater than the reference voltage. In one addition, the second table may have a longer delay time than the first table at the same cooling water temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
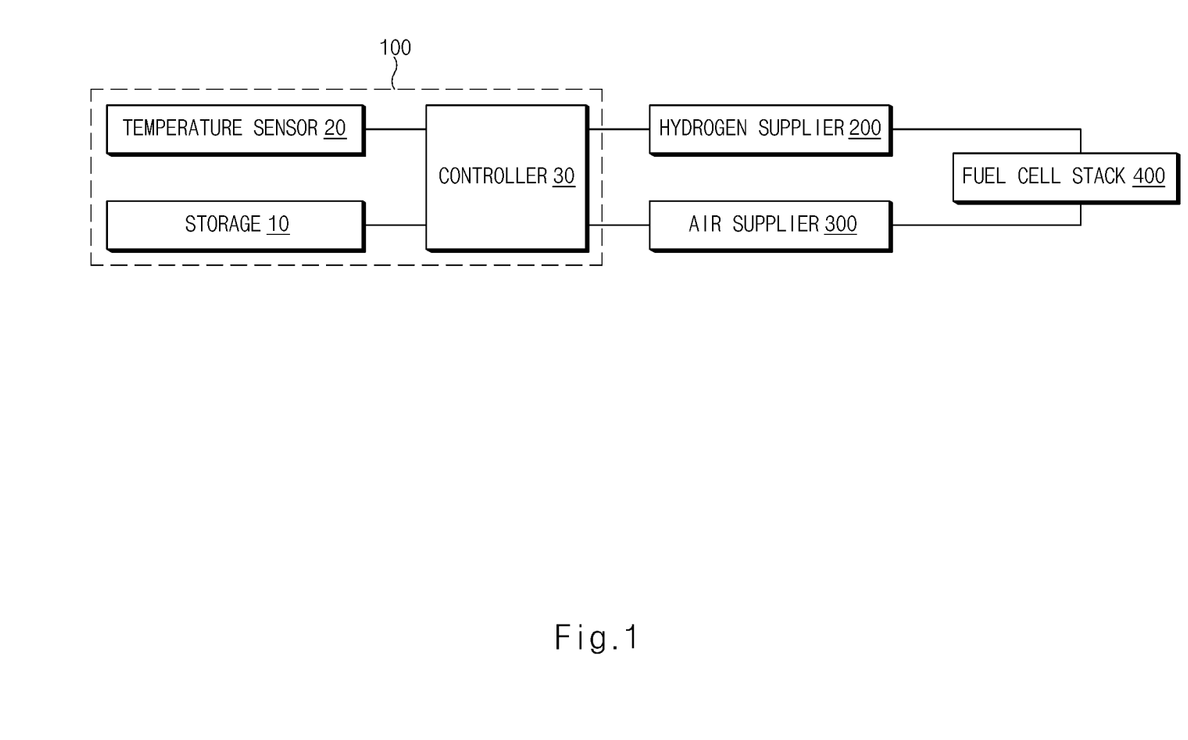
FIG. 1 is a configuration diagram of a start-up control device of a fuel cell vehicle according to an exemplary embodiment of the present disclosure.

FIG. 1 is a configuration diagram of a start-up control device of a fuel cell vehicle according to an exemplary embodiment of the present disclosure. As shown in FIG. 1, a start-up control device 100 of a fuel cell vehicle according to an exemplary embodiment of the present disclosure may include storage 10, a temperature sensor 20, and a controller 30. In this connection, components may be coupled to each other to be implemented as a single component and some components may be omitted based on a scheme for executing the start-up control device 100 of the fuel cell vehicle according to an exemplary embodiment of the present disclosure.

In a description of each component, first, the storage 10 may be configured to store various logics, algorithms, and programs required in a process of adjusting an air supply initiating time point based on a cooling water temperature at an outlet of a fuel cell stack 400 during start-up of the fuel cell vehicle. The storage 10 may be configured to store a table in which a time difference between a hydrogen supply initiating time point and the air supply initiating time point for each cooling water temperature at the outlet of the fuel cell stack 400 is recorded. In this connection, the storage 10 may be configured to store a first table applied when air is not introduced into a cathode of the fuel cell stack 400, and a second table applied when the air is introduced into the cathode of the fuel cell stack 400.

Figure 2:
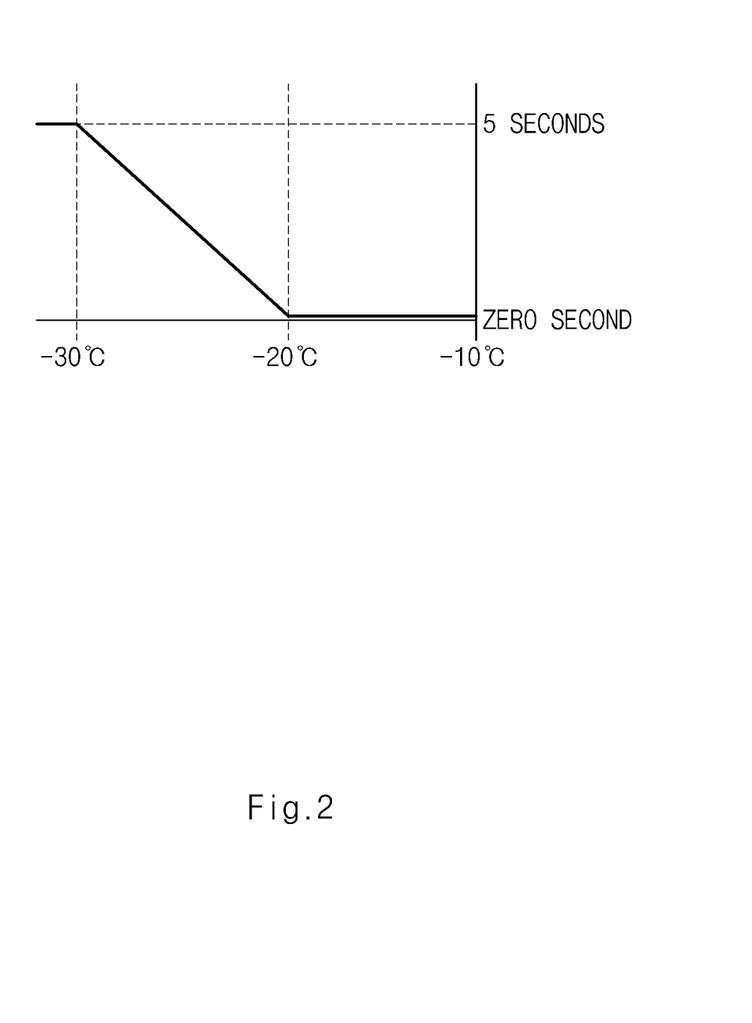
FIG. 2 is an exemplary view showing a first table stored in storage disposed in a start-up control device of a fuel cell vehicle according to an exemplary embodiment of the present disclosure.

FIG. 2 is an exemplary view showing a first table stored in storage disposed in a start-up control device of a fuel cell vehicle according to an exemplary embodiment of the present disclosure. In FIG. 2, a horizontal axis represents the cooling water temperature at the outlet of the fuel cell stack 400 and a vertical axis represents the time difference between the hydrogen supply initiating time point and the air supply initiating time point. In other words, the vertical axis represents a delay time from the initiation of the hydrogen supply to the initiation of the air supply. It may be seen that the first table, which is applied when the air is not introduced into the cathode of the fuel cell stack 400, increases the delay time when the cooling water temperature is low, and thus, sufficient hydrogen may be supplied to the cathode of the fuel cell stack.

Figure 3:
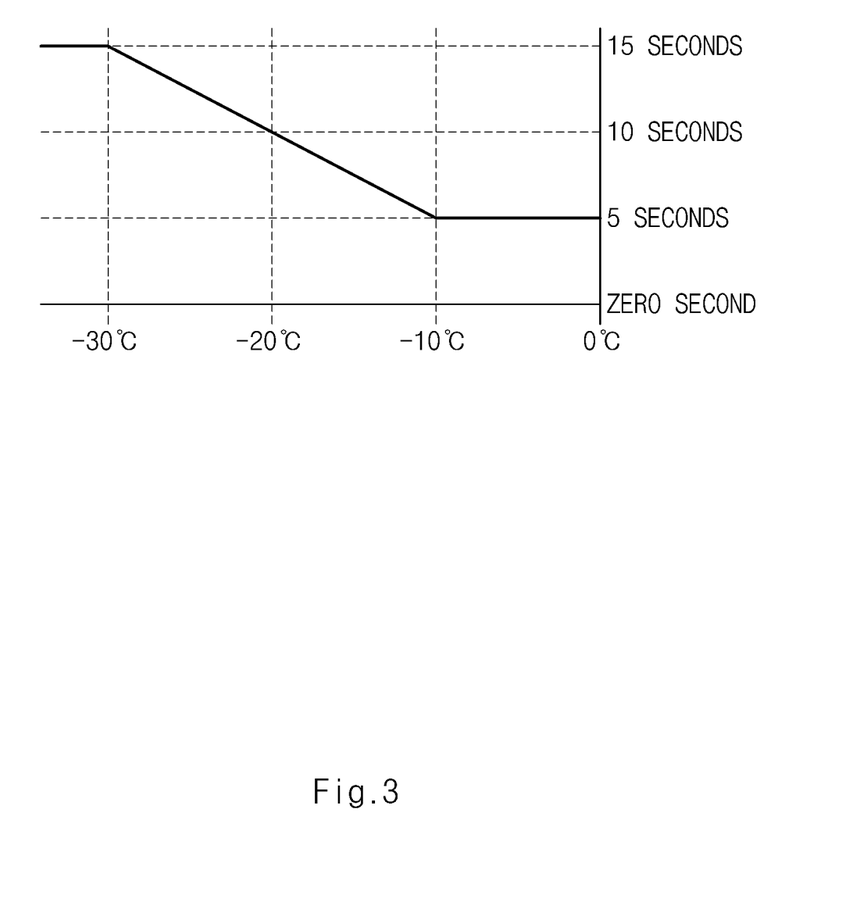
FIG. 3 is an exemplary view showing a second table stored in storage disposed in a start-up control device of a fuel cell vehicle according to an exemplary embodiment of the present disclosure.

FIG. 3 is an exemplary view showing a second table stored in storage disposed in a start-up control device of a fuel cell vehicle according to an exemplary embodiment of the present disclosure. In FIG. 3, a horizontal axis represents the cooling water temperature at the outlet of the fuel cell stack 400 and a vertical axis represents the time difference between the hydrogen supply initiating time point and the air supply initiating time point. It may be seen that, like the first table, the second table, which is applied when the air is introduced into the cathode of the fuel cell stack 400, also increases the delay time when the cooling water temperature is low, and thus, the sufficient hydrogen may be supplied to the cathode of the fuel cell stack. However, the delay time is longer than that of the first table at the same cooling water temperature.

The storage 10 may include at least one type of a storage medium of a memory such as a flash memory type, a hard disk type, a micro type, and a card type (for example, a secure digital card (SD card) or an extream digital card (XD card)), and the like, and a memory such as a random access memory (RAM), a static RAM (SRAM), a read only memory (ROM), a programmable ROM (PROM), an electrically erasable PROM (EEPROM), a magnetic RAM (MRAM), a magnetic disk, and an optical disk type.

The temperature sensor 20 may be configured to measure the cooling water temperature at the outlet of the fuel cell stack 400. The temperature sensor 20 may also be configured to measure a cooling water temperature at an inlet of the fuel cell stack 400. The controller 30 may be configured to execute overall operation of each component to perform a function thereof normally. Such controller 30 may be embodied in a form of hardware or software, or may be in a form of a combination thereof. Preferably, the controller 30 may be embodied as a microprocessor, but may not be limited thereto. The controller 30 may be connected to a vehicle network to collect various information. In this connection, the vehicle network may include a controller area network (CAN), a local interconnect network (LIN), a FlexRay, a media oriented systems transport (MOST), an Ethernet, and the like.

The controller 30 may be configured to perform various controls in the process of adjusting the air supply initiating time point based on the cooling water temperature at the outlet of the fuel cell stack 400 during the start-up of the fuel cell vehicle. The controller 30 may be configured to operate the temperature sensor 20 to measure the cooling water temperature at the outlet of the fuel cell stack 400. In addition, controller 30 may be configured to operate the temperature sensor 20 to measure the cooling water temperature at the inlet of the fuel cell stack 400. The controller 30 may be configured to detect an open circuit voltage (OCV) of the fuel cell stack 400. A technology for detecting the OCV of the fuel cell stack 400 in the present disclosure is not the subject of the present disclosure. Therefore, any of a variety of widely known schemes may be used.

The controller 30 may be configured to obtain various information such as a supply time point of the hydrogen, a supply pressure of the hydrogen, and the like in conjunction with a hydrogen supplier 200 constituting a fuel cell system. The controller 30 may be configured to detect the OCV of the fuel cell stack 400 at a time point after a reference time (e.g., about 1 second) after the supply pressure of the hydrogen reaches a target pressure (e.g., about 140 kPa). Further, the controller 30 may be configured to determine that the air is not introduced into the cathode of the fuel cell stack 400 in response to determining that the OCV is less than a reference voltage (e.g., about 30 V), and may be configured to determine that the air is introduced into the cathode of the fuel cell stack 400 in response to determining that the OCV is equal to or greater than the reference voltage. In response to determining that the air is not introduced into the cathode of the fuel cell stack 400, the controller 30 may be configured to adjust the air supply initiating time point based on the first table as shown in FIG. 2.

In FIG. 2, the controller 30 may be configured to initiate the air supply about 5 seconds after the hydrogen supply is initiated when the cooling water temperature is equal to or less than about −30° C., initiate the air supply about 2.5 seconds after the hydrogen supply is initiated when the cooling water temperature is about −25° C., and supply the hydrogen and the air at almost the same time (e.g., about 0.5 second difference) to the fuel cell stack 400 when the cooling water temperature exceeds about −20° C. In response to determining that the air is introduced into the cathode of the fuel cell stack 400, the controller 30 may be configured to adjust the air supply initiating time point based on the second table as shown in FIG. 3.

In FIG. 3, the controller 30 may be configured to initiate the air supply about 15 seconds after the hydrogen supply is initiated when the cooling water temperature is equal to or below about −30° C., initiate the air supply about 10 seconds after the hydrogen supply is initiated when the cooling water temperature is about −20° C., and initiate the air supply about 5 seconds after the hydrogen supply is initiated when the cooling water temperature exceeds about −10° C. The controller 30 may be configured to adjust a time point at which the air is supplied to the fuel cell stack 400 in conjunction with an air supplier 300 constituting the fuel cell system.

Figure 4:
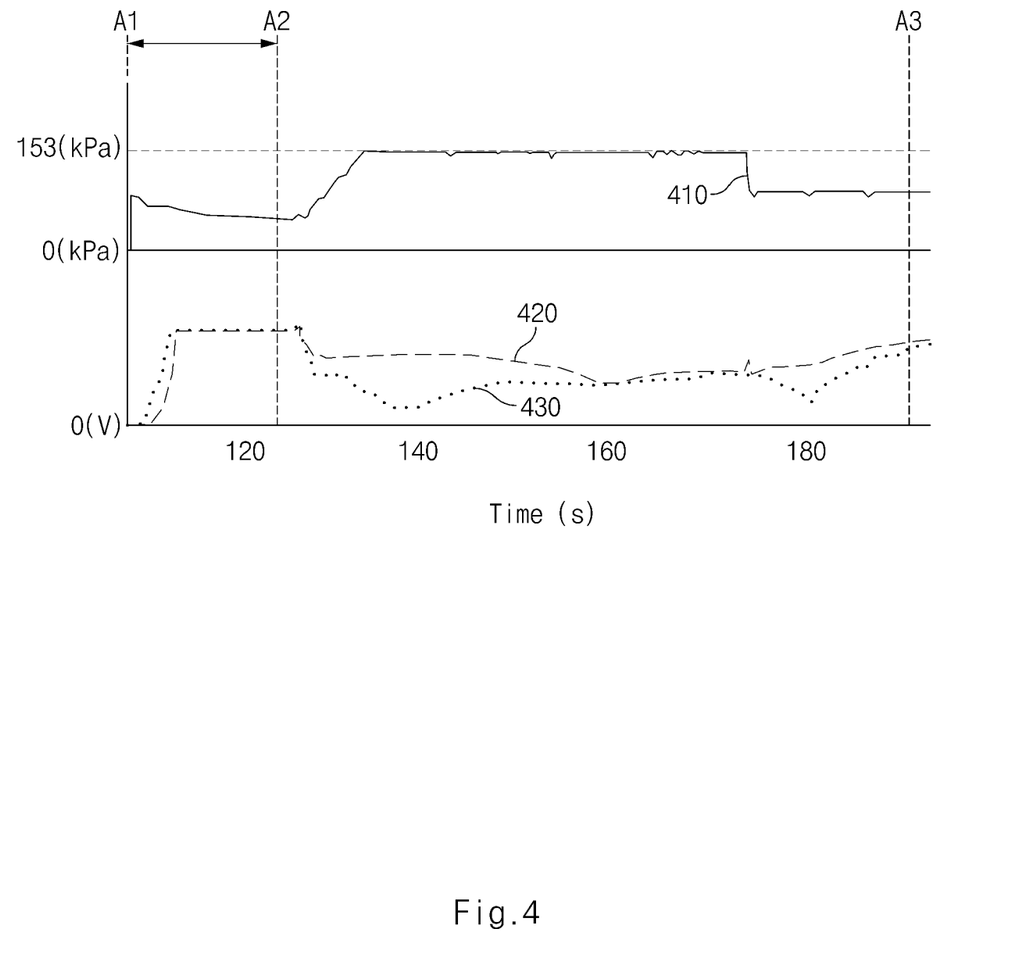
FIG. 4 is an exemplary view showing a performance of a start-up control device of a fuel cell vehicle according to an exemplary embodiment of the present disclosure.

FIG. 4 is an exemplary view showing a performance of a start-up control device of a fuel cell vehicle according to an exemplary embodiment of the present disclosure, which shows a performance when the cooling water temperature at the outlet of the fuel cell stack 400 is equal to or less than about −30° C. and when the air is introduced into the cathode of the fuel cell stack 400 due to a failure of an air cutoff valve (ACV). In FIG. 4, A1 represents a time point at which the hydrogen supply was initiated, A2 represents a time point at which the air supply was initiated, and A3 represents a time point at which the start-up of the fuel cell vehicle is completed (e.g., a time point at which an output of the fuel cell stack is stabilized). '410' is a graph showing the supply pressure of the hydrogen, '420' is a graph showing a voltage of a first cell, and '430' is a graph showing a voltage of a second cell.

The controller 30 may be configured to initiate the supply of the air at the time point A2 15 seconds after the time point A1 based on the second table. It may be identified that a minimum cell voltage of the fuel cell stack 400 is equal to or greater than about 0 V by delaying the air supply initiating time point in this way to allow the sufficient hydrogen to be supplied to the fuel cell stack 400. In other words, it may be identified that a cell reverse voltage (e.g., a minus voltage) did not occur.

Figure 5:
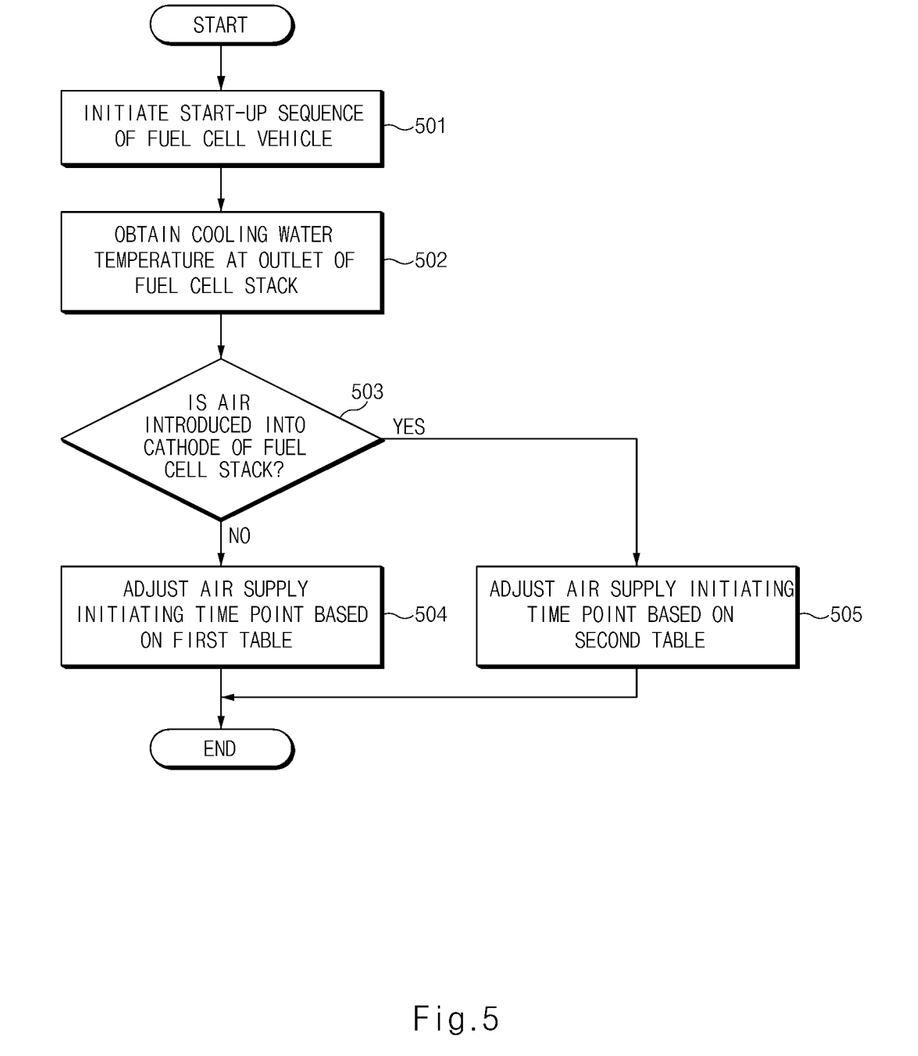
FIG. 5 is a flowchart of a start-up control method of a fuel cell vehicle according to an exemplary embodiment of the present disclosure.

FIG. 5 is a flowchart of a start-up control method of a fuel cell vehicle according to an exemplary embodiment of the present disclosure. First, the controller 30 may be configured to initiate a start-up sequence of the fuel cell vehicle in response to a request from a user (501). In this connection, the user may request to initiate the start-up sequence by pressing a start-up button while engaging a brake pedal or by turning a start-up key to set a power supply state of the fuel cell vehicle to an ON state.

Thereafter, the controller 30 may be configured to obtain the cooling water temperature at the outlet of the fuel cell stack from the temperature sensor 20 (502). Thereafter, the controller 30 may be configured to determine whether the air is introduced into the cathode of the fuel cell stack 400 (503). In response to determining that the air is not introduced into the cathode of the fuel cell stack 400, the air supply initiating time point may be adjusted based on the first table (504). In response to determining that the air is introduced into the cathode of the fuel cell stack 400, the air supply initiating time point may be adjusted based on the second table (505).

Figure 6:
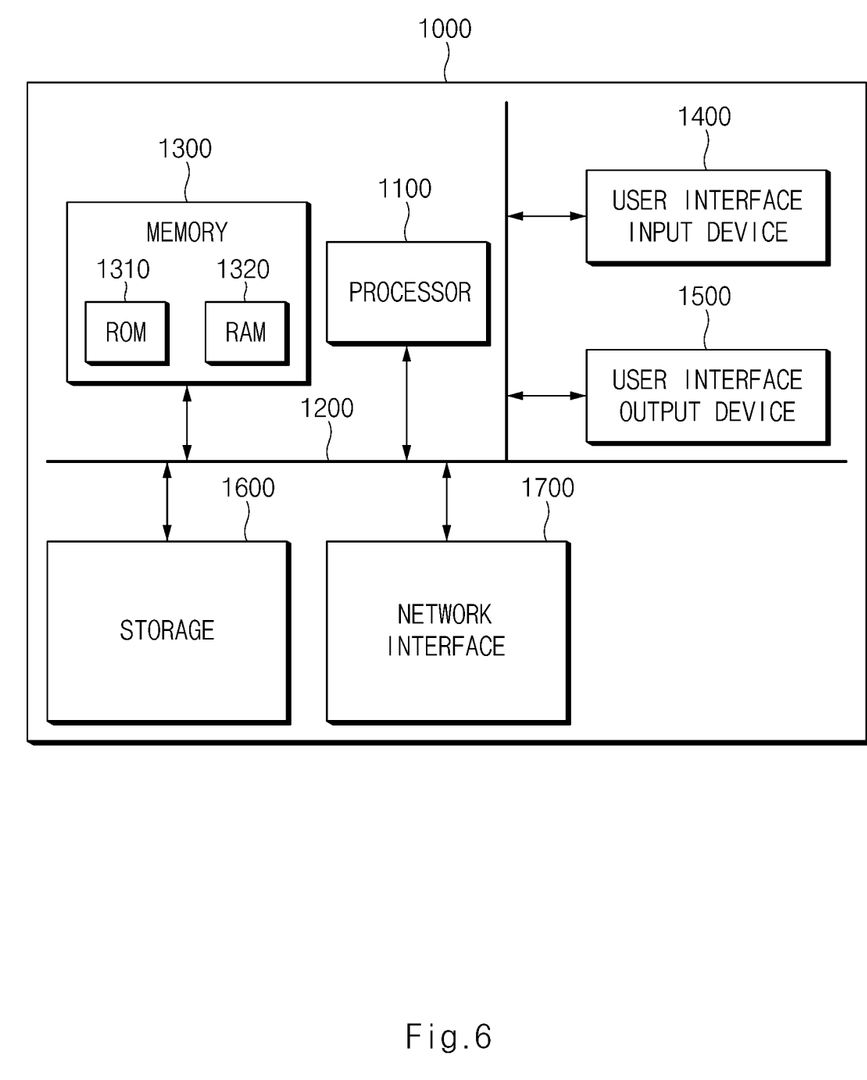
FIG. 6 is a block diagram showing a computing system for executing a connected car service information protecting method according to an exemplary embodiment of the present disclosure.

FIG. 6 is a block diagram showing a computing system for executing a connected car service information protecting method according to an exemplary embodiment of the present disclosure. Referring to FIG. 6, the connected car service information protecting method according to an exemplary embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the start-up of the fuel cell vehicle according to an exemplary embodiment of the present disclosure have the table in which the time difference between the hydrogen supply initiating time point and the air supply initiating time point is recorded for each cooling water temperature at the outlet of the fuel cell stack, and adjust the air supply initiating time point based on the table during the start-up of the fuel cell vehicle to prevent the cell reverse voltage as well as the cell voltage deviation of the fuel cell stack.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling start-up of a fuel cell vehicle, comprising:
   a temperature sensor configured to measure a cooling water temperature of a fuel cell stack; and
   a controller configured to adjust an air supply initiating time point based on the cooling water temperature of the fuel cell stack during the start-up of the fuel cell vehicle.

2. The device of claim 1, wherein the temperature sensor configured to measure a cooling water temperature at an outlet of the fuel cell stack.

3. The device of claim 1, further comprising:
   storage configured to store a table, wherein a time difference between a hydrogen supply initiating time point and the air supply initiating time point for each cooling water temperature of the fuel cell stack is recorded in the table.

4. The device of claim 3, wherein the table includes:
   a first table applied when air is not introduced into a cathode of the fuel cell stack; and
   a second table applied when the air is introduced into the cathode of the fuel cell stack.

5. The device of claim 4, wherein the controller is configured to:
   adjust the air supply initiating time point based on the first table in response to determining that the air is not introduced into the cathode of the fuel cell stack; and
   adjust the air supply initiating time point based on the second table in response to determining that the air is introduced into the cathode of the fuel cell stack.

6. The device of claim 5, wherein the controller is configured to:
   at a time point after a reference time after a pressure of hydrogen supplied to the fuel cell stack reaches a target pressure, determine that the air is not introduced into the cathode of the fuel cell stack when an open circuit voltage (OCV) of the fuel cell stack is less than a reference voltage; and
   determine that the air is introduced into the cathode of the fuel cell stack when the OCV of the fuel cell stack is equal to or greater than the reference voltage.

7. A method for controlling start-up of a fuel cell vehicle, comprising:
   initiating, by a processor, a start-up sequence of the fuel cell vehicle;
   obtaining, by the processor, a cooling water temperature of a fuel cell stack; and
   adjusting, by the processor, an air supply initiating time point based on the obtained cooling water temperature.

8. The method of claim 7, wherein the cooling water temperature is a cooling water temperature at an outlet of the fuel cell stack.

9. The method of claim 7, further comprising:
   storing, by the processor, a table, wherein a time difference between a hydrogen supply initiating time point and the air supply initiating time point for each cooling water temperature of the fuel cell stack is recorded in the table.

10. The method of claim 9, wherein the table includes:
    a first table applied when air is not introduced into a cathode of the fuel cell stack; and
    a second table applied when the air is introduced into the cathode of the fuel cell stack.

11. The method of claim 10, wherein the adjusting of the air supply initiating time point includes:
    determining, by the processor, whether the air is introduced into the cathode of the fuel cell stack;
    adjusting, by the processor, the air supply initiating time point based on the first table in response to determining that the air is not introduced into the cathode of the fuel cell stack; and
    adjusting, by the processor, the air supply initiating time point based on the second table in response to determining that the air is introduced into the cathode of the fuel cell stack.

12. The method of claim 11, wherein the determining of whether the air is introduced into the cathode of the fuel cell stack includes:
    detecting, by the processor, an open circuit voltage (OCV) of the fuel cell stack at a time point after a reference time after a pressure of hydrogen supplied to the fuel cell stack reaches a target pressure;
    determining, by the processor, that the air is not introduced into the cathode of the fuel cell stack in response to determining that the OCV of the fuel cell stack is less than a reference voltage; and
    determining, by the processor, that the air is introduced into the cathode of the fuel cell stack in response to determining that the OCV of the fuel cell stack is equal to or greater than the reference voltage.

13. A device for controlling start-up of a fuel cell vehicle, comprising:
    a storage configured to store a first table and a second table, wherein a time difference between a hydrogen supply initiating time point and an air supply initiating time point for each cooling water temperature at an outlet of a fuel cell stack is recorded in the first table and the second table;
    a temperature sensor configured to measure the cooling water temperature at the outlet of the fuel cell stack; and
    a controller configured to:
    during the start-up of the fuel cell vehicle, adjust the air supply initiating time based on the first table in response to determining that air is not introduced into a cathode of the fuel cell stack; and adjust the air supply initiating time point based on the second table in response to determining that the air is introduced into the cathode of the fuel cell stack.

14. The device of claim 13, wherein the controller is configured to:

at a time point after a reference time after a pressure of hydrogen supplied to the fuel cell stack reaches a target pressure, determine that the air is not introduced into the cathode of the fuel cell stack in response to determining that an open circuit voltage (OCV) of the fuel cell stack is less than a reference voltage; and determine that the air is introduced into the cathode of the fuel cell stack in response to determining that the OCV of the fuel cell stack is equal to or greater than the reference voltage.

15. The device of claim 13, wherein the second table has a longer delay time than the first table at the same cooling water temperature.

* * * * *